United States Patent [19]
Saito et al.

[11] Patent Number: 5,359,894
[45] Date of Patent: Nov. 1, 1994

[54] ACCELERATION DETECTOR HAVING HIGHLY ACCURATE GAPS IN MAGNETIC CIRCUIT INCLUDING A DIFFERENTIAL TRANSFORMER

[75] Inventors: Hidetoshi Saito; Masahiro Kume, both of Itami, Japan

[73] Assignee: Sumitomo Electric Industries, Ltd., Osaka, Japan

[21] Appl. No.: 851,947

[22] Filed: Mar. 13, 1992

[30] Foreign Application Priority Data

Mar. 15, 1991 [JP] Japan .................. 3-015307[U]
May 17, 1991 [JP] Japan .................. 3-034923[U]

[51] Int. Cl.⁵ .......................................... G01P 15/11
[52] U.S. Cl. .................................. 73/517 R; 336/30
[58] Field of Search ............ 73/517 R, 516 R, 517 B; 336/30

[56] References Cited

U.S. PATENT DOCUMENTS

| | | | |
|---|---|---|---|
| 2,332,994 | 10/1943 | Draper | 336/30 X |
| 2,570,672 | 10/1951 | Hathaway | 336/30 |
| 2,870,422 | 1/1959 | Gindes | 336/30 |
| 3,440,459 | 4/1969 | Pitt | 310/15 |
| 3,540,291 | 11/1970 | Ivers | 73/517 B |
| 4,922,753 | 5/1990 | Idogaki | 73/517 R X |
| 5,220,834 | 6/1993 | Saito | 73/517 R |

FOREIGN PATENT DOCUMENTS

| | | |
|---|---|---|
| 0359367 | 3/1990 | European Pat. Off. |
| 59-95266 | 6/1984 | Japan . |
| 3-214063 | 9/1991 | Japan .................. 73/517 R |
| 9111723 | 8/1991 | WIPO .................. 73/517 R |

*Primary Examiner*—Hezron E. Williams
*Assistant Examiner*—Christine K. Oda
*Attorney, Agent, or Firm*—Wenderoth, Lind & Ponack

[57] ABSTRACT

An acceleration detector includes a magnetic body movable under acceleration, and a differential transformer having primary coils and secondary coils and arranged so that an output differential is produced between the secondary coils when the movable magnetic body is displaced. The movable magnetic body extends through the primary coils and the secondary coils and has opposite ends protruding from the coils. Leaf springs are provided to support the protruding ends of the movable magnetic body. The case comprises a cylindrical body surrounding the outer periphery of the differential transformer and lids closing openings of the body at both ends thereof. Between the lids and both ends of the movable body predetermined gaps are provided through which a magnetic flux can flow. The leaf springs are secured in position between end faces of the body and the lids.

18 Claims, 3 Drawing Sheets

ACCELERATION DETECTOR HAVING HIGHLY ACCURATE GAPS IN MAGNETIC CIRCUIT INCLUDING A DIFFERENTIAL TRANSFORMER

BACKGROUND OF THE INVENTION

This invention relates to an acceleration detector for detecting the acceleration of a moving body such as an automobile.

Among the known acceleration detectors, there is one in which the motion of a magnetic body moving under acceleration is detected by use of a differential transformer.

FIG. 5 shows one example. If acceleration is applied to this acceleration detector 41 in the direction A in this figure, a magnetic body 44 supported by leaf springs 43a and 43b moves in the direction B while resiliently deforming the leaf springs. By this movement, the portion of the magnetic body 44 that is present inside a righthand secondary coil 47b will be longer than its portion located inside a lefthand secondary coil 47a. This produces a difference in induced voltage between the secondary coils 47a and 47b. The acceleration is detected by this difference.

In FIG. 5, reference numeral 46 designates a primary coil and 42 a case. One example of this type of detector is disclosed in Japanese Utility Model Unexamined Publication No. 59-95266.

With this type of detector, since an induced voltage difference is produced between the right and left secondary coils in response to the relative displacement between the secondary coils and the magnetic body, the magnetic reluctance between the primary coil and the secondary coils is rather large and thus the sensitivity of detection tends to be low. Further, in order to stabilize its performance, the parts have to be positioned relative to each other with high accuracy. This requires time-consuming adjustment work and thus the efficiency of assembly is low and the assembling cost high. Moreover, since there is no standard for positioning, accurate adjustment is difficult, which will makes it difficult to achieve performance stability.

SUMMARY OF THE INVENTION

Objects of this invention are to obviate these shortcomings, to improve the detecting sensitivity of the detector, to make it possible to improve the relative positioning accuracy of the parts easily, and to stabilize the performance, simplify the assembly and reduce the assembling cost.

In order to achieve the above objects, the present invention provides an acceleration detector comprising a case, a movable magnetic body mounted in the case so as to be movable under acceleration, a differential transformer having primary coils and secondary coils and being arranged so that an output differential is produced between the secondary coils when the movable magnetic body is displaced, the movable magnetic body extending through the primary coils and the secondary coils and having both ends thereof protruding from the coils, leaf springs supporting the protruding ends of the movable magnetic body, and the case comprising a cylindrical body surrounding the outer periphery of the differential transformer and a pair of lids closing openings of the body at both ends thereof, the lids and the ends of the movable body defining predetermined gaps therebetween through which a magnetic flux can flow, the leaf springs being secured in position between end faces of the magnetic body and the lids.

In the acceleration detector according to the present invention, after inserting the lids of the case into the openings of the body, they may be secured to the body by caulking the body along the edges of the case defining the openings. Magnetic pieces may be press-fitted to both ends of the movable magnetic body with free ends of the leaf springs being sandwiched and fixed in position therebetween. The differential transformer may include two bobbins made of resin and provided with pairs of the coils respectively. Each pair comprises one primary and one secondary coil which are wound concentrically around the respective bobbin. Further, a yoke is integrally provided betweeen the bobbins and secured to the case. The bobbins may be provided at both ends thereof with protrusions pressed against the lids of the case to hold the bobbins in a fixed position. Alternatively, the bobbins may have their outer peripheral portions fixed to the inner wall of the body of the case. These arrangements will ensure the accuracy of the dimensional relationship between the parts, facilitate the assembly thereof and are thus reliable. When coupling the magnetic pieces to both ends of the movable magnetic body, since the pieces become in effect parts of the movable magnetic body, the predetermined gaps are provided between the pieces and the side walls of the magnetic case.

The magnetic flux produced by the primary coils is transmitted through the movable magnetic body to the secondary coils, thus inducing a voltage in the secondary coils. The magnitude of the induced voltage is determined by the amount of the magnetic flux passing through the secondary coils. The amount of the magnetic flux passing through the secondary coils is in turn determined by the magnetic reluctance of the magnetic circuit present between the primary coils and the secondary coils. According to this invention, the gaps provided between the movable magnetic body and the side walls of the case are adapted to change. This serves to change the magnetic flux and thus establish the detecting sensitivity.

Namely, when the movable magnetic body is moved under acceleration toward one end, one of the gaps between the movable magnetic body and the side walls of the magnetic case decreases and the other increases. As a result, the magnetic reluctance decreases at the one end due to the gap, so that the amount of magnetic flux passing through this portion (that is, the amount of magnetic flux passing through the magnetic case toward the secondary coils) increases compared with the prior art structure. At the other end, the magnetic reluctance increases due to the gap, so that a phenomenon opposite to the above occurs. Since the flow rate of magnetic flux increases at one end and decreases at the other end, the difference between the voltages of the secondary coils induced by the magnetic flux is large compared with the prior art. By measuring this difference, even a very small acceleration can be detected.

According to this invention, unlike a prior art detector in which an induced voltage differential is produced between the two secondary coils according to the relative position between the movable magnetic body and the secondary coils, a voltage differential (detector output) is produced according to changes in the width of gaps. This eliminates the need to set the relative position between the coils and the movable magnetic body with high accuracy (which is very difficult because there is no reference surface). On the other hand, the relative position between the yoke and the coils as well as the widths of the gaps at both ends of the movable magnetic body have to be set with high accuracy. According to this invention, the movable magnetic body has its ends supported by the leaf springs, which are in turn secured between the end faces of the body of the magnetic case and the end faces of the lids. Thus, the widths of the gaps at both ends of the movable magnetic body can be set with high accuracy.

In another arrangement wherein the magnetic pieces are coupled to both ends of the movable magnetic body with the free ends of the leaf springs secured therebetween, the distance between the two leaf springs and the dimensions from the leaf springs to the end faces of the pieces can be set with high accuracy, using both ends of the movable magnetic body as references. Higher gap accuracy results in higher sensitivity.

By integrally forming the yoke and the bobbins on which the primary and secondary coils are concentrically wound, the relative position between the yoke and the coils can be set accurately.

Further, by fixing the lids and body of the case together by caulking, the leaf springs can be fixed simultaneously. This simplifies the structure and the assembling work.

In the arrangement in which the pieces are press-fitted to the movable magnetic body, no stress (such as due to welding heat) will occur. This leads to performance stability.

In the arrangement in which the bobbins are secured to both ends or the outer periphery of the case, the bobbins will never be displaced in the case. This not only leads to stability of performance but contributes to the simplicity of the structure because no additional fixing parts are necessary.

In the acceleration detector according to this invention, the movable magnetic body has its ends supported by the leaf springs which are held between the end faces of the body of the case and the lids. This allows for a high degree of dimensional accuracy between the leaf springs and the inner surface of the lids of the case and thus of the gaps provided at both ends of the movable magnetic body. Further, by fixing the body and the lids of the case together by caulking, the assembling steps are relatively few as the leaf springs are fixed in position when connecting these parts of the case.

Also, in the arrangement where the pieces made of magnetic material are press-fit to both ends of the movable magnetic body to secure the free ends of the leaf springs between the pieces and the movable magnetic body, the dimensions between the leaf springs and the end faces of the pieces can be set with high accuracy and thus the distance between the leaf springs, and the widths of the gaps can be set with high accuracy. Further, the leaf springs can be kept free of any unnecessary stress. This leads to higher sensitivity and stabler performance.

In the arragement where the primary and secondary coils are wound concentrically around bobbins made of resin and integral with the yoke, the positional accuracy between the bobbins and the yoke is high.

Accordingly, this invention provides a high-performance acceleration detector which is easy and inexpensive to manufacture.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
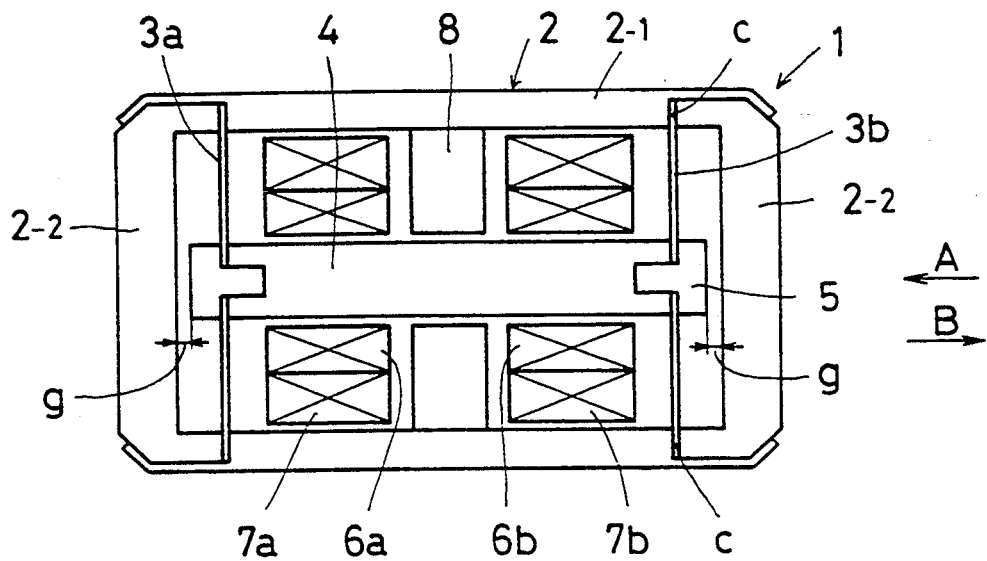
FIG. 1 is a schematic view of one embodiment of the acceleration detector according to this invention.

Before the description proceeds, it is to be noted that where like parts are designated by the same reference numerals throughout the accompanying drawings, a detailed description thereof will be omitted for the sake of brevity.

FIG. 1 schematically shows the first embodiment. An acceleration detector 1 has a case 2 made of a magnetic material. The case 2 comprises a cylindrical body 2-1 and two cup-shaped lids 2-2 closing the openings at both ends of the body. Leaf springs 3a and 3b have both of their ends sandwiched (as shown at c of FIG. 1) between the axial abutting surfaces of the lids and the body. The right and left lids 2-2 are inserted in the openings of the body 2-1. The body has thin edge portions, extending around the openings, bent inward (or caulked) to fix together the body and the lids and thus the leaf springs 3a and 3b.

A movable magnetic body 4 extends axially between the central parts of the leaf springs 3a and 3b. The movable magnetic body is formed with holes in both ends thereof and into which are press-fitted protrusions of magnetic pieces 5 to fix the free ends of the leaf springs 3a and 3b to the movable magnetic body 4. In this state, there are predetermined gaps g provided between the outer ends of the magnetic pieces 5 and the inner walls of the side walls (or lids 2-2) of the case.

Concentrically provided around the movable magnetic body 4 are primary coils 6a and 6b of a differentially transformer for generating a magnetic flux and secondary coils 7a and 7b for detecting change in magnetic flux. As is apparent from the figure, the coils 6a and 7a and the coils 6b and 7b are provided in pairs at left and right sides of the body, the coils of each pair being stacked one on the other. A yoke 8 is provided between these pairs of coils. As is also apparent from the figure, the openings of the cylindrical body 2 are larger than the outer periphery of the differential transformer whereby the differential transformer can pass into the cylindrical body through the openings during assembly of the detector.

In the first embodiment, when the moving body is accelerated or decelerated, the movable magnetic body 4 (having a mass M) is subjected to a force F=M.G. The leaf springs 3a and 3b are deformed by the force F until this force balances with the force of the leaf springs 3a and 3b and thus the movable magnetic body 4 is displaced. Such a displacement is proportional to the acceleration G if the spring constant of the springs 3a, 3b and the mass M are constant. Thus, the gaps g between the inner surfaces of the lids 2-2 and the end faces of the pieces 5 change in proportion to the acceleration G.

If the acceleration detector 1 is accelerated in the direction A in the figure, the movable magnetic body 4 will move in the direction B. Thus, the gap at the righthand side decreases while the gap at the left increases. This allows a smoother flow of magnetic flux between the righthand lid 2-2 and the movable magnetic body 4, so that the magnetic flux transmitted from the primary coil 6b to the secondary coil 7b increases. Thus, a larger voltage is induced at the secondary coil than when the acceleration is zero. In contrast, on the lefthand side, due to the increased gap size, the magnetic reluctance increases. This reduces the magnetic flux passing through the secondary coil 7a and thus, the output voltage. It will be apparent from the foregoing that in this state, the output of the secondary coil 7b is larger and the output of the coil 7a is smaller compared with the prior art arrangements. Thus, the difference in output between the coils due to the acceleration is greater than with the conventional arrangements. This serves to increase the sensitivity of detection.

If the acceleration applied in the direction A in the figure is excessive, the movable magnetic body 4 will abut the inner surface of the lid, so that any further movement is prevented. Thus, even if excessive acceleration is applied, the leaf springs 3a and 3b are protected against excessive deflection, permanent deformation or breakage.

With this arrangement, various dimensions, including the size of the gaps provided at both ends of the movable magnetic body can be provided with accuracy and the assembly thereof is simple.

Figure 2:
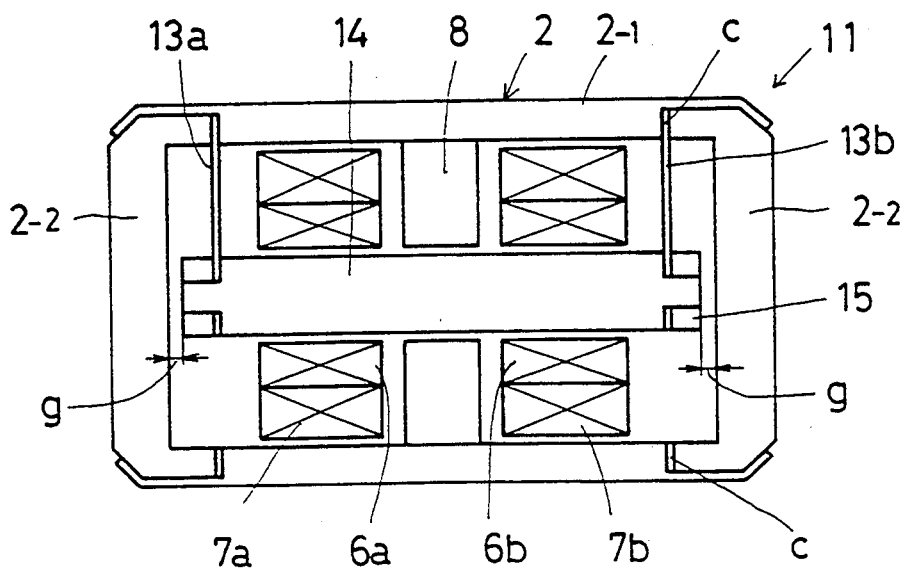
FIG. 2 is a schematic view of the second embodiment.

FIG. 2 schematically shows the second embodiment. This acceleration detector 11 is similar to the first embodiment in structure and function. The only differences are that two leaf springs 13a and 13b are in the form of cantilevers and that the movable magnetic body 14 is provided at both ends with projections onto which are press-fitted ring-shaped pieces 15 to fix the free ends of the leaf springs to the movable magnetic body 14. Because the pieces 15 are ring-shaped, they can be machined easily.

Figure 3:
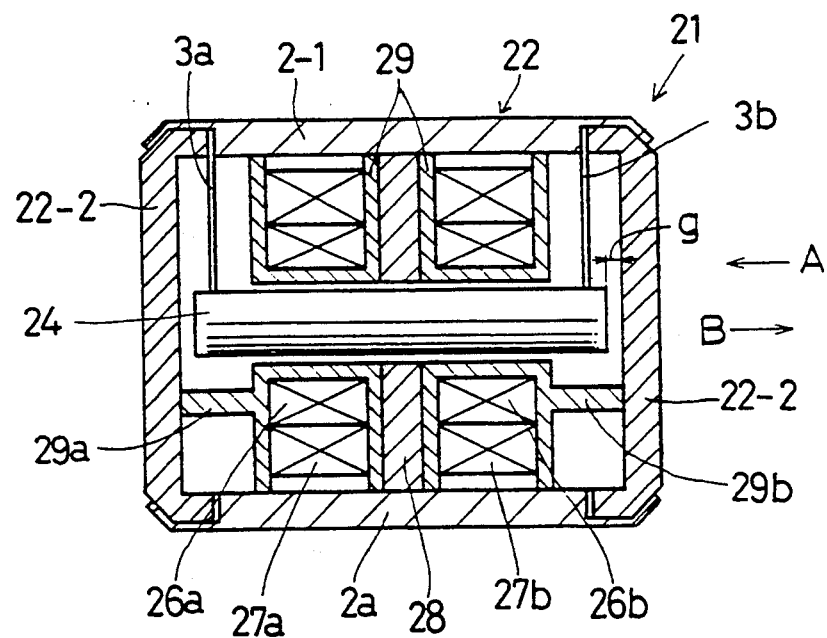
FIG. 3 is a schematic view of the third embodiment.

FIG. 3 schematically shows the third embodiment. An acceleration detector 21 has primary coils 26a and 26b and secondary coils 27a and 27b. The coils 26a and 27a and the coils 26b and 27b are provided in pairs, the coils of each pair being disposed one on the other concentrically around bobbins 29 made of resin to form coil units provided around a magnetic movable body 24 on both sides thereof. A yoke 28 is provided between the bobbins 29 and thus between the coil units so as to be integral therewith. The bobbins 29 are provided at both ends thereof with protrusions 29a and 29b which are held by lids 22-2 to fix the bobbins 29 in position in the case 22. This serves to simplify the assembling of the device.

Figure 4:
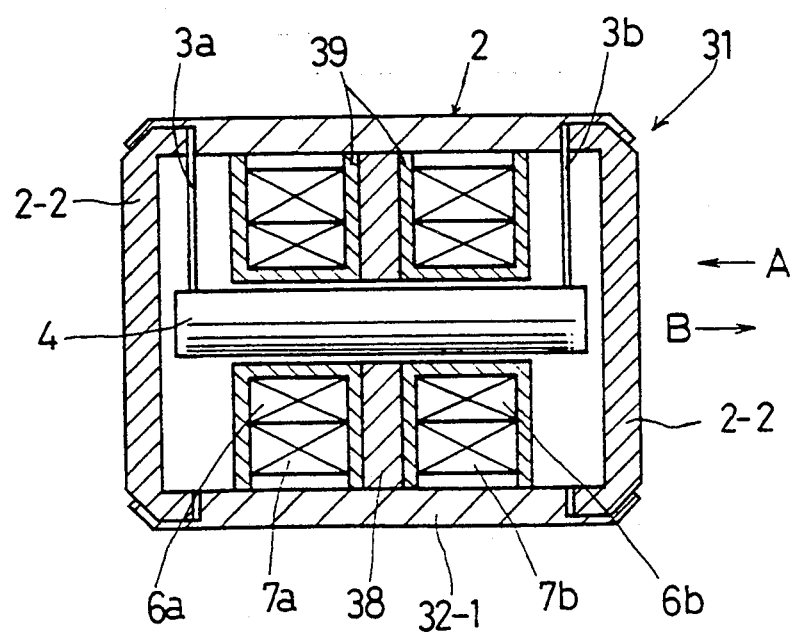
FIG. 4 is a schematic view of the fourth embodiment.
Figure 5:
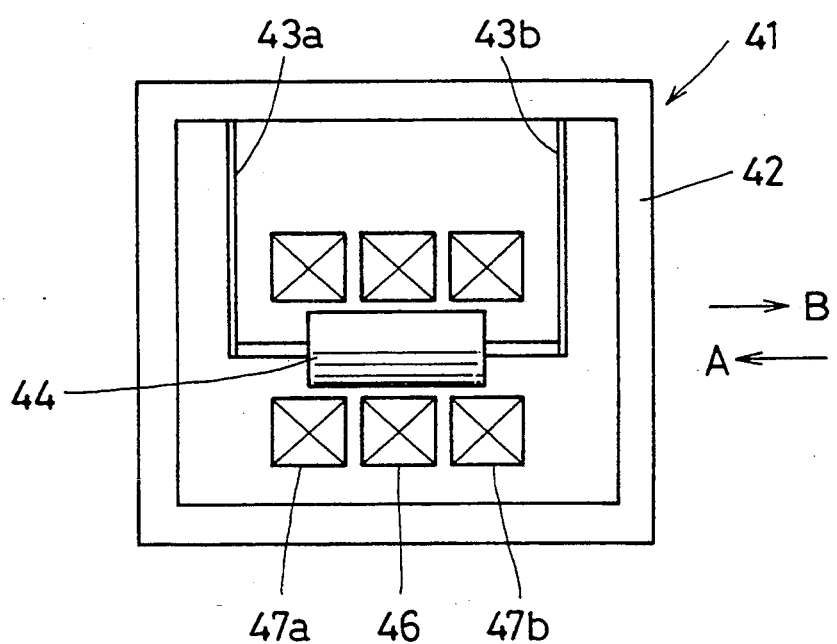
FIG. 5 shows a prior art differential transformer type of acceleration detector.

FIG. 4 schematically shows the fourth embodiment. This acceleration detector 31 has substantially the same structure as the third embodiment and functions in a similar manner. This embodiment differs from the third embodiment in that the yoke 38 is inserted between the bobbins 39 when forming the bobbins so as to form an assembly in which bobbins are integral with the yoke. The assembly has outer peripheral portions (of the bobbins) fixed to the inner periphery of the case 32-1 instead of fixing the bobbins at their ends to the case as in the third embodiment. With this arrangement, the yoke 38 and the bobbins 39 are connected firmly and thus are positioned relative to one another with a high degree of accuracy.

It will be understood from the above description that the best form of the acceleration detector according to this invention will have the coil and yoke of the detector in the first or second embodiment mounted in the manner of the third or fourth embodiment.

What is claimed is:

1. An acceleration detector comprising: a case, a magnetic body disposed in said case, leaf springs supporting said magnetic body so as to be movable within said case under a force of acceleration, and a differential transformer disposed in said case, said differential transformer including primary coils and secondary coils, said magnetic body extending axially through each of said coils and having opposite ends disposed axially outwardly of said coils such that an output differential is produced between said secondary coils when said magnetic body is displaced axially under the force of acceleration, said leaf springs supporting said magnetic body at said opposite ends thereof, said case including a cylindrical body surrounding an outer peripheral portion of said differential transformer and having openings at opposite ends thereof, and a pair of lids attached to said cylindrical body at the opposite ends of the cylindrical body closing said openings, said openings each being larger than the outer peripheral portion of said differential transformer, whereby the differential transformer can pass into said cylindrical body through said openings during assembly of the detector, and each of said leaf springs being sandwiched between and secured in position by said cylindrical body and a respective one of said lids.

2. An acceleration detector as claimed in claim 1, wherein said lids of said case and said body are caulked together.

3. An acceleration detector as claimed in claim 2, and further comprising magnetic pieces coupled to the ends of said movable magnetic body, said leaf springs having ends fixed between the ends of said magnetic body and said magnetic pieces, respectively.

4. An acceleration detector as claimed in claim 3, wherein said magnetic pieces are press-fitted to the ends of said magnetic body.

5. An acceleration detector as claimed in claim 2, wherein said differential transformer comprises a pair of bobbins made of resin, a respective one of said primary coils and a respective one of said secondary coils being wound concentrically around each of said bobbins, and further comprising a yoke interposed between and integral with said bobbins, said yoke being secured to said case.

6. An acceleration detector as claimed in claim 5, wherein said bobbins and said yoke constitute an assembly having opposite ends and protrusions extending at said opposite ends of the assembly against said lids of said case thereby fixing said bobbins in position in the case.

7. An acceleration detector as claimed in claim 5, wherein said bobbins and said yoke are integral and constitute an assembly, and said assembly has an outer peripheral portion fixed to the inner wall of said body of said case.

8. An acceleration detector as claimed in claim 1, and further comprising magnetic pieces coupled to the ends of said movable magnetic body, said leaf springs having ends fixed between the ends of said magnetic body and said magnetic pieces, respectively.

9. An acceleration detector as claimed in claim 8, wherein said magnetic pieces are press-fitted to the ends of said magnetic body.

10. An acceleration detector as claimed in claim 9, wherein said differential transformer comprises a pair of bobbins made of resin, a respective one of said primary coils and a respective one of said secondary coils being wound concentrically around each of said bobbins, and further comprising a yoke interposed between and integral with said bobbins, said yoke being secured to said case.

11. An acceleration detector as claimed in claim 10, wherein said bobbins and said yoke constitute an assembly having opposite ends and protrusions extending at said opposite ends of the assembly against said lids of said case thereby fixing said bobbins in position in the case.

12. An acceleration detector as claimed in claim 10, wherein said bobbins and said yoke are integral and constitute an assembly, and said assembly has an outer peripheral portion fixed to the inner wall of said body of said case.

13. An acceleration detector as claimed in claim 8, wherein said differential transformer comprises a pair of bobbins made of resin, a respective one of said primary coils and a respective one of said secondary coils being wound concentrically around each of said bobbins, and further comprising a yoke interposed between and integral with said bobbins, said yoke being secured to said case.

14. An acceleration detector as claimed in claim 13, wherein said bobbins and said yoke constitute an assembly having opposite ends and protrusions extending at said opposite ends of the assembly against said lids of said case thereby fixing said bobbins in position in the case.

15. An acceleration detector as claimed in claim 13, wherein said bobbins and said yoke are integral and constitute an assembly, and said assembly has an outer peripheral portion fixed to the inner wall of said body of said case.

16. An acceleration detector as claimed in claim 1, wherein said differential transformer comprises a pair of bobbins made of resin, a respective one of said primary coils and a respective one of said secondary coils being wound concentrically around each of said bobbins, and further comprising a yoke interposed between and integral with said bobbins, said yoke being secured to said case.

17. An acceleration detector as claimed in claim 16, wherein said bobbins and said yoke constitute an assembly having opposite ends and protrusions extending at said opposite ends of the assembly against said lids of said case thereby fixing said bobbins in position in the case.

18. An acceleration detector as claimed in claim 16, wherein said bobbins and said yoke are integral and constitute an assembly, and said assembly has an outer peripheral portion fixed to the inner wall of said body of said case.

* * * * *